United States Patent Office 3,175,010
Patented Mar. 23, 1965

3,175,010
4,4'-METHYLENEBIS(2,6-DIALKYLPHENOL) COMPOUNDS
Thomas H. Coffield, Heidelberg, Germany, and Allen H. Filbey, Walled Lake, Mich., assignors to Ethyl Corporation, New York, N.Y., a corporation of Virginia
No Drawing. Filed May 19, 1960, Ser. No. 30,076
The portion of the term of the patent subsequent to July 5, 1977, has been disclaimed
1 Claim. (Cl. 260—619)

This invention relates to novel chemical compounds having utility in the chemical arts, and particularly useful as antioxidants.

In particular, this invention relates to novel 4,4'-methylenebis(2,6-dialkylphenol) compounds which are eminently suited for use as antioxidants. These compounds may also be referred to as 1,1-bis(3,5-dialkyl-4-hydroxyphenyl)methanes.

In our prior co-pending application, Serial No. 536,315, filed September 23, 1955, now U.S. Patent No. 2,944,086, issued July 5, 1960, and application Serial No. 829,201, filed July 24, 1959, now U.S. Patent 3,043,775, issued July 10, 1962, of which prior applications this application is a continuation-in-part, we have disclosed and claimed a novel and unusual class of phenolic compounds having the formula

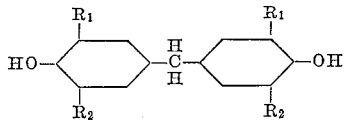

wherein the groups designated by $R_1$ and $R_2$ are alkyl groups containing from 3 to 8 carbon atoms and are further characterized by being branched on their alpha carbon atoms, and the use of these compounds as antioxidants in organic material, such as lubricating oils.

Typical of these compounds are 1,1-bis-(3,5-diisopropyl-4-hydroxyphenyl)methane;
1,1-bis-(3,5-di-sec-butyl-4-hydroxyphenyl)methane;
1,1-bis-(3-isopropyl-5-tert-butyl-4-hydroxyphenyl)methane;
1,1-bis-(3,5-di-(2-octyl)-4-hydroxyphenyl)methane;
1,1-bis-(3-sec-butyl-5-(2-hexyl)-4-hydroxyphenyl)methane;
1,1-bis-(3-isopropyl-5-(1,1,3,3-tetramethylbutyl)-4-hydroxyphenyl)methane;
1,1-bis-(3-tert-butyl-5-tert-amyl-4-hydroxyphenyl)methane;
1,1-bis-(3,5-di-tert-amyl-4-hydroxyphenyl)methane;
1,1-bis-(3,5-di-(1,1,3,3-tetramethylbutyl)-4-hydroxyphenyl)methane;
1,1-bis-(3-tert-butyl-5-(1,1,2,2-tetramethylpropyl)-4-hydroxyphenyl)methane;
1,1-bis-(3,5-di-tert-butyl-4-hydroxyphenyl)methane, and the like.

The purpose of the present application is to disclose and claim a sub-class of the compounds, disclosed in the above identified earlier filed applications, which have superior and unexpected properties as additives.

Among the objects of the present invention is that of providing new chemical compounds useful both as antioxidants and for other purposes. A principal object is to provide compositions of matter protected against oxidative deterioration. Another object is to provide a hydrocarbon oil normally tending to deteriorate in the presence of oxygen containing these new compounds in amount sufficient to inhibit this deterioration. Another object is to provide lubricating oil normally tending to deteriorate in the presence of oxygen containing in amount sufficient to inhibit such deterioration a small antioxidant quantity of novel and highly effective antioxidants. Still another object is to provide organic polymers, particularly polypropylene, stabilized against oxidative deterioration of the presence therein of a small antioxidant quantity of novel and highly effective antioxidant. A still further object is to provide improved antiknock fluids. Another object is to provide stabilized edible material. Other objects will be apparent from the ensuing description.

It has now been found that among the above described compounds, a certain special group have outstanding and extremely valuable properties. These are described as 4,4'-methylene-bis-(2,6-dialkylphenol) compounds having the formula:

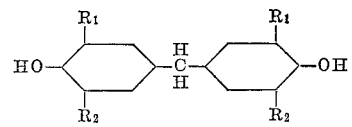

wherein $R_1$ is an isopropyl group and $R_2$ is an alkyl group containing from 3 to 8 carbon atoms further characterized by being branched on their alpha carbon atoms.

A preferred embodiment of this invention relates to 4,4'-methylene-bis(2-isopropyl-6-tert-alkylphenol) compounds in which the tert-alkyl group all contain from 4 to 8 carbon atoms. This preferred embodiment encompasses compounds which are particularly effective antioxidants for oxygen-sensitive oils, such as lubricating oil, transformer oil, turbine oil, gear oil, greases containing the aforesaid type of oils and the like.

A particularly preferred embodiment of this invention is 4,4'-methylene-bis(2-isopropyl-6-tert-butylphenol). This compound is a superlative antioxidant for a wide variety of oxygen-sensitive organic material, particularly lubricating oils and greases as well as antiknock fluids, polymers and fatty material.

The compounds of the present invention, that is, those having an isopropyl group ortho to each phenolic hydroxyl, are unusually soluble in and compatible with a wide variety of organic material, and are, in addition unexpectedly much more effective antioxidants than closely related materials.

Typical compounds of this invention include 4,4'-methylene-bis(2,6-diisopropylphenol);
4,4'-methylene-bis(2-isopropyl-6-sec-butylphenol);
4,4'-methylene-bis(2-isopropyl-6-tert-butylphenol);
4,4'-methylene-bis[2-isopropyl-6-(2-octyl)phenol];
4,4'-methylene-bis[2-isopropyl-6-(1,1,3,3-tetramethylbutyl)phenol], and the like.

The preferred class of compounds of this invention includes 4,4'-methylene-bis(2-isopropyl-6-tert-amylphenol);
4,4'-methylene-bis[2-isopropyl-6-(1,1,3,3-tetramethylbutyl)phenol];
4,4'-methylene-bis[2-isopropyl-6-(1,1,2,2-tetramethylpropyl)phenol]

and the like.

As indicated above, 4,4'-methylene-bis(2-isopropyl-6-tert-butylphenol) is a particularly preferred compound of this invention.

The compounds of this invention are white crystalline solids and are soluble in various organic solvents and in gasolines, diesel fuels, hydrocarbon oils and the like. These compounds are further characterized by being relatively stable, non-hygroscopic, readily crystallizable materials.

The compositions of this invention find important utility as antioxidants in a wide variety of oxygen sensitive materials; thus, liquid and solid products derived from petroleum crude are found to possess greatly increased storage stability by the use of an antioxidant of this invention. For example, gasoline jet fuel, kerosene, fuel oil, turbine oils, insulating oils, motor oils and various waxes have increased oxidative stability when they contain an antioxidant of this invention. Likewise, liquid hydrocarbon fuels which contain organometallic additives such as tetraethyllead and other organometalilc compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers both derived from naturally occurring sources and those synthetically prepared. Thus, natural rubbers and synthetic rubbers, including oil extended rubbers and sulfur vulcanized rubbers are greatly benefited by the practice of this invention. Examples of the synthetic rubbers protected by the practice of this invention include such synthetics as polybutadiene, methyl rubber, polybutadiene rubber, butyl rubber, GR-S rubber, GR-N rubber, piperylene rubber and dimethylbutadiene rubber.

The practice of this invention is also useful in protecting paraffin and micro-crytsalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example, potato chips, fried fish, donuts, crackers, and various types of pastry such as cakes and cookies. Furthermore, fat fortified animal feeds and fish meals used as animal feeds are greatly benefited by the practice of this invention. Not only are these compositions protected against oxidative deterioration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soy bean oil, rapeseed oil, coconut oil, olive oil, palm oil, corn oil, sesame oil, peanut oil, babassu oil, citrus oils, cotton seed oil and various compositions containing these including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinyl acetate, various epoxide resins and polyester resins and polymers including the alkyds. However, in particular the compositions of this invention are outstanding antioxidants for saturated hydrocarbon synthetic polymers derived from polymerization of an aliphatic monoolefin hydrocarbon compound having preferably up to 5 carbon atoms and only a single unit of unsaturation per monomeric molecule. Examples of such monomers include ethylene, propylene, butylene, isobutylene, 2-methyl-4-butene, 2-methyl-3-butene and the like. Thus the polymers are homopolymers and copolymers of ethylene, propylene, butylene, iosbutylene and the pentenes and are usually solid. Polyethylene and polypropylene are preferred polymers in the practice of this invention and they are derived from the polymerization of ethylene and propylene, respectively.

The compounds of this invention are white crystalline solids and are soluble in various organic solvents and in gasolines, diesel fuels, hydrocarbon oils and the like. These compounds are further characterized by being relatively stable, non-hygroscopic, readily crystallizable materials.

The compounds of this invention are prepared by reacting formaldehyde with a 2,6-dialkylphenol in which both alkyl groups contain from 3 to 8 carbon atoms, both of said alkyl groups being branched on their alpha carbon atoms. In conducting this process according to a preferred embodiment, approximately two moles of the above-defined phenol are condensed with each mole of formaldehyde employed, using an alkali metal hydroxide such as sodium hydroxide as catalyst. This condensation reaction is conducted in a solvent consisting essentially of a monohydric alcohol containing from 1 to about 8 carbon atoms, preferably isopropyl alcohol. The reaction temperature is in the range of from about 20 to about 100° C. and preferably in the range of from about 50 to about 60° C.

The alkali metal hydroxide catalyst is used in catalytic quantities, namely, in amount equivalent to from about 0.5 to about 3 percent by weight of the phenol used in the reaction.

The following examples, wherein all parts and percentages are by weight, illustrate the compounds of this invention and the methods by which they are prepared.

EXAMPLE 1

In a reaction vessel equipped with stirring means, condensing means, thermometer and reagent introducing means was placed a solution of 6.6 parts of potassium hydroxide dissolved in 400 parts of isopropanol. To this stirred solution maintained under nitrogen atmosphere was added 206 parts of 2,6-di-tert-butylphenol. At a temperature of 30° C. a total of 45.4 parts of 37 percent formalin solution was added dropwise. On heating to 60° C. a red color developed and a precipitation of crystalline product began. The mixture was stirred for 1½ hours at 60° C., cooled and the solid filtered off. The product was washed twice with 200 parts of isopropanol containing 10 parts of concentrated hydrochloric acid. After drying, the yield of product was 87 percent, melting point 154 to 155° C. The following chemical analysis showed the compound to be 4,4'-methylenebis-(2,6-di-tert-butylphenol). Calculated for $C_{29}H_{44}O_2$, 82.2 percent carbon and 10.4 percent hydrogen. Found: 81.8 percent carbon and 10.5 percent hydrogen.

EXAMPLE 2

Using the reaction equipment of Example 1, 178 parts of 2,6-diisopropylphenol is reacted with 45.3 parts of 37 percent formal solution in the presence of 6.6 parts of potassium hydroxide. 400 parts of isopropanol is used as the solvent. The reaction temperature is 50° C. A good yield of 4,4'-methylenebis(2,6-diisopropylphenol) is obtained by hydrolyzing the reaction mixture and extracting the product with ethyl ether. Evaporation of the ether solution gives an oil which slowly crystallizes.

EXAMPLE 3

4,4' - methylenebis(2,6-di-[1,1,3,3 - tetramethylbutyl]-phenol) is prepared as follows: In the reaction vessel of Example 1 are placed 318 parts of 2,6-di-(1,1,3,3-tetramethylbutyl)phenol, 6.6 parts of potassium hydroxide, 45.3 parts of 37 percent aqueous formalin solution and 400 parts of isopropanol. This mixture is stirred at 60° C. for 2½ hours. On cooling, the crystalline product which is formed is filtered off.

EXAMPLE 4

In the reaction vessel of Example 1 are placed 492 parts of 2-isopropyl-6-tert-butylphenol, 4 parts of sodium hydroxide, 45.3 parts of aqueous formalin solution and 400 parts of isopropanol. This mixture is stirred at 65° C. for 3 hours. The mixture is then poured into excess cold water, extracted with ethyl ether, and the ether evaporated to give a residual oil which slowly crystallizes. This crystalline product is 4,4'-methylenebis(2-isopropyl-6-tert-butylphenol).

EXAMPLE 5

In the reaction equipment described in Example 1 and using 400 parts of isopropanol as reaction solvent and 4 parts of sodium hydroxide as condensation catalyst, 234 parts of 2,6-di-tert-amylphenol is reacted with 45.3 parts of 37 percent aqueous formalin solution. The temperature of this condensation reaction is 60° C. and the reaction time is 2½ hours. The solid material which precipitates is filtered off to give 4,4'-methylenebis (2,6-di-tert-amylphenol).

EXAMPLE 6

4,4' - methylenebis(2 - sec-butyl-6-tert-butylphenol) is prepared as follows: To the reaction vessel of the apparatus described in Example 1 are added 208 parts of 2-sec-butyl-6-tert-butylphenol, 45.3 parts of 37 percent aqueous formalin solution, 4 parts of sodium hydroxide and 400 parts of n-propanol. The reactants are maintained at a temperature of 70° C. for a period of 3 hours. The reaction mixture is then poured into cold water, extracted with ethyl ether, from which is recovered the crystalline 4,4' - methylenebis(2-sec-butyl-6-tert-butylphenol) by evaporating off the ether.

EXAMPLE 7

310 parts of 2,6-di-(1,1,2,2-tetramethylpropyl)phenol is reacted with 45.3 parts of 36 percent aqueous formalin solution in the reaction equipment described in Example 1. 500 parts of isopropanol is used as reaction solvent and 6.6 parts of potassium hydroxide is used as the condensation catalyst. The reaction temperature is 60° C. and the reaction time is 3 hours. 4,4'-methylenebis[2,6-di-(1,1,2,2-tetramethylpropyl)phenol] is recovered by filtration of the reaction mixture from which this compound crystallizes.

EXAMPLE 8

A solution of 16 parts potassium hydroxide in 600 parts of isopropyl alcohol was stirred in a reaction vessel and 56 parts para formaldehyde was added followed by the addition of 480 parts of 2-tert-butyl-6-isopropyl-phenol. After stirring at 84.5° for 3 hours the reaction mixture was neutralized with glacial acetic acid. After dilution with 5000 parts of water the mixture was separated. The top yellow organic layer solidified and was taken up in ether, washed, dried and stripped to give 440 parts of orange-yellow solid. The aqueous layer was extracted with ether which after washing, drying, and stripping gave 40 parts orange-yellow solid. The combined solids (97 percent crude yield) were recrystalized from isooctane to give 330 parts of yellow crystals M.P. 111–115°. Recrystallization of a portion of this material gave pale yellow crystals M.P. 114–115° which were analyzed. Analysis showed the compound to contain 82.1 percent carbon and 10.35 percent hydrogen. The calculated content is 81.8 percent carbon and 10.17 percent hydrogen. This analysis, along with infrared examination confirmed the compound to be 4,4'-methylenebis(2-isopropyl-6-tert-butylphenol).

EXAMPLE 9

The procedure of Example 6 is repeated using 2-isopropyl-6-tert-amylphenol as the starting material to give a good yield of 4,4'-methylenebis(2-isopropyl-6-tert-amylphenol).

EXAMPLE 10

Following the procedure of Example 5, 250 parts of 2-isopropyl-6-(1,1,3,3-tetramethylbutyl)phenol is reacted with formaldehyde to give 4,4'-methylenebis-[2-isopropyl-6-(1,1,3,3-tetramethylbutyl)-phenol].

An embodiment of this invention involves providing a lubricating oil normally susceptible to oxidative deterioration containing, in amount sufficient to inhibit such deterioration, a small antioxidant quantity of the above 4,4'-methylenebis(2,6-dialkylphenol). It has been found that in actual practice that small amounts of these compounds very effectively stabilize lubricant compositions—e.g. petroleum hydrocarbon oils and synthetic diester oils—against oxidative deterioration.

To prepare the lubricants of this invention an appropriate quantity—from about 0.001 to about 2 percent and preferably from about 0.25 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids, and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils. In the case of lubricating oils containing 4,4'-methylenebis(2-isopropyl-6-tert-butylphenol), spectacular improvements are afforded, including markedly reduced engine wear characteristics, greatly improved oxidation stability and greatly reduced bearing corrosion properties.

The following examples illustrate various specific embodiments of this invention. Parts and percentages are by weight. The physical characteristics of the illustrative oils used in Examples 11 through 19 are shown in Table I.

*Table I*

PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, percent | 0.2 | 0.3 | 0.3 | 0.3 | 0.3 | 0.1 |

EXAMPLE 11

To 100,000 parts of Oil A is added with stirring 1000 parts (1 percent) of 4,4'-methylenebis(2-isopropyl-6-tertbutylphenol). The resultant oil possesses enhanced resistance to oxidative deterioration.

EXAMPLE 12

To 100,000 parts of Oil B is added 50 parts (0.05 percent) of 4,4'-methylenebis(2-isopropyl-6-sec-butylphenol). After mixing, the resulting oil possesses enhanced oxidation resistance.

EXAMPLE 13

With 100,000 parts of Oil C is blended 10 parts (0.01 percent) of 4,4'-methylenebis[2-isopropyl-6-(3-octyl)-phenol]. The resulting oil is found to possess very good resistance to oxidative deterioration.

EXAMPLE 14

To 100,000 parts of Oil D is added 500 parts (0.5 percent) of 4,4'-methylenebis(2,6-diisopropyl phenol). After agitation, the homogeneous lubricant possesses especially good resistance against oxidative deterioration.

EXAMPLE 15

With 100,000 parts of Oil E is blended 100 parts (0.1 percent) of 4,4'-methylenebis-(2,6-di-tert-butylphenol). The resultant lubricant is found to possess good resistance to high temperature oxidative deterioration.

EXAMPLE 16

To 100,000 parts of Oil F is added 3000 parts (3 percent) of 4,4'-methylenebis(2,6-diisopropylphenol). After mixing, the resultant oil is greatly resistant to oxidative deterioration.

EXAMPLE 17

With 100,000 parts of Oil A is blended 20 parts (0.02 percent) of 4,4'-methylenebis(2-isopropyl-6-sec-hexylphenol. Substantially increased is the resistance of this oil against oxidative deterioration.

EXAMPLE 18

To 100,000 parts of Oil B is added 500 parts (0.5 percent) of 4,4'-methylenebis(2-isopropyl-6-tert-amylphenol). The finished oil is highly resistant to oxidative deterioration.

EXAMPLE 19

To 100,000 parts of Oil C is added 80 parts (0.08 percent) of 4,4'-methylenebis(2,6-di-tert-octylphenol). The mixture is agitated and found to possess good resistance against oxidative deterioration.

EXAMPLE 20

To illustrate the outstanding benefits obtained by the practice of this invention, a standard oil oxidation test is used. The equipment and test procedure described by Kroger et al., Erdöl und Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In the oil tested the induction period was 3 minutes when the oil contained no additive. However when $1.0 \times 2^{-10}$ moles per liter (about 0.48 weight percent) of 4,4'-methylenebis(2-isopropyl-4-tert-butylphenol) was added to the oil, the induction period was 150 minutes, a 50-fold increase over the induction of the uninhibited oil. The result is a far greater improvement than can be obtained with other closely related compounds.

Synthetic lubricants which are enhanced by the practice of this invention are, in general, non-hydrocarbon organic compositions; i.e., organic compositions which contain elements other than carbon and hydrogen. Examples of general classes of material which are protected against oxidative deterioration by the inclusion therein of a compound of this invention included diester lubricants, silicones, halogen containing organic compounds including the fluorocarbons, polyalkylene glycol lubricants, and organic phosphates which are suitable as hydraulic fluids and lubricants. Excellent results are obtained with any of these classes of materials; however, it has been found that exceptional oxidative stability upon prolonged storage is imparted to diester lubricants by the practice of this invention. The synthetic diester oils stabilized by the practice of this invention include sebacates, adipates, etc., which find particular use as aircraft instrument oils, hydraulic and damping fluids, and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable luibricating properties and the inhibitor of this invention very effectively stabilizes these materials against oxidative deterioration. Thus, use can be made of oxalates, malonates, succinates, glutarates, adipates, pimelates, suberates, azelates, sebacates, etc.

The diester lubricants used in the lubricant compositions of this invention have the formula:

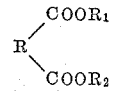

where A is an aliphatic hydrocarbon radical which may be saturated or unsaturated and has from 2 to 14 carbon atoms and $R_1$ and $R_2$ are straight or branched chain alkyl groups. The diesters utilized in the preferred lubricant compositions, include esters of succinic, glutaric, adipic, pimelic, suberic, azelaic and sebacic acid. Typical examples of such esters are diisooctyl azelate, di(2-ethylhexyl) sebacate, di-sec-amyl sebacate, diisooctyl adipate, di(2-ethylhexyl) adipate, di(2-ethylhexyl) azelate, di-(1-methyl-4-ethyloctyl) glutarate diisoamyl adipate di-(2-ethylhexyl) glutarate, di(2-ethylbutyl) adipate, di-tetradecyl sebacate and di(2-ethylhexyl) pinate.

The preferred diesters are generally prepared by esterifying one mole of a dicarboxylic acid having the general formula: $HOOC(CH_2)_xCOOH$, where $x$ is an integer of from 2 to 8, with 2 moles of a branched chain alcohol containing at least 4 carbon atoms. Typical are the reactions of succinic, glutaric, adipic, pimelic, suberic or azelaic acid with sec-amyl alcohol, 3-ethyl butane, 2-ethyl hexanol or the branched chain secondary alcohols undecanol or tetradecanol.

The preferred diester lubricant fluids have molecular weights ranging from about 300 to about 600 and freezing and pouring points from about −40° to less than about −100° F. Their flash and fire points range from about 300° F. to about 500° F. and their spontaneous ignition temperatures range from about 100° to about 800° F. The diesters made by reacting a dicarboxylic acid with a branched chain alcohol have been found to have superior viscometric properties as compared with diesters made by reacting dihydric alcohols with monocarboxylic acids and thus, diesters prepared by the former method are preferred in formulating the lubricant compositions of this invention.

The diester oils may be formed by the reaction of a polycarboxylic acid with a mono-hydric alcohol, the reaction of a polyhydric alcohol with a mono-carboxylic acid, reaction between a polyhydric alcohol with a polycarboxylic acid, or combinations of the above reactions; for example, reaction of a polycarboxylic acid with a glycol and a mono-hydric alcohol, reaction of a glycol with a polycarboxylic acid and a mono-carboxylic acid, or the reaction of a glycol, a mono-hydric alcohol, a polycarboxylic acid and a mono-carboxylic acid. The acids may be mono-carboxylic aliphatic acids such as, propionic acid, valeric acid, 2-ethyl enanthic acid, 2,2-dipropyl butyric acid or 3-(2-methylhexyl) valeric acid. They may contain unsaturated linkages, such as, in senecioic acid, sorbic acid, or angelic acid; they may be polycarboxylic aliphatic acids such as succinic acid, glutaric acid, azelaic acid, 5-octene-1,8-dicarboxylic acid, or 3-hexene-2,3,4-tricarboxylic acid, and they may be aromatic or cycloaliphatic acids, such as cyclohexaneacetic acid, 1,4-cyclopentylenebis acetic acid, phthalic acid, hemimellitic acid, and terephthalic acid.

The alcohols used in preparing the polyester lubricant base materials may be aliphatic mono-hydric alcohols such as propanol, 2-ethyl-3-hexenol, 2-ethyl-4-propyl heptanol, 2-butenol, or 2-methyl propanol. They may be polyhydric aliphatic alcohols, such as 1,6-hexamethylene glycol, 1,10-decamethylene glycol, 2-hexene-1,6-diol, and 1,6-heptylene glycol, and they may be mono or polyhydric alicyclic or aromatic alcohols, such as 4-[m-(2-hydroxyethyl)phenyl]butanol, 3-(2-hydroxyethyl) cyclohexanebutanol, p-hydroxymethyl) phenethyl alcohol, α-methyl-p-xylene-α,α′-diol, 1,4 - cyclohexane - β,β′-diethyl-dimethanol, 2,3-bis(4-hydroxybutyl)benzyl alcohol, 4,4′ - [3-(3-hydroxyhexyl)-o-phenylene]dibutanol, and 5-[3 - (3-hydroxypropyl)cyclopenta-2,4-dienylene]3-ethyl amyl alcohol.

Another class of synthetic lubricants which achieve enhanced oxidative stability by the practice of this invention includes the "silicone" lubricants. The term "silicone" as used in the specification and claims of this application is defined as a synthetic compound containing silicon and organic groups. In naming specific compounds, the nomenclature system recommended by the American Chemical Society Committee on Nomenclature, Spelling and Pronunciation (Chem. Eng. News, 24, 1233 (1046)), will be used. Thus, the compounds which have the —Si—O—Si— linkages are the siloxanes. Derivatives of silane, SiH$_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further, included are silicate ester oils, such as tetraalkyloxy and tetraaryloxy silanes of the tetra-2-ethylhexyl and tetra-p-tert-butylphenyl types, and the silanes. Also included are the halogen-substituted siloxanes, such as the chlorophenylpolysiloxanes.

The polyalkyl, polyaryl, and polyalkyl polyaryl siloxanes are the preferred types of base medium for the silicon-containing lubricant compositions of the invention because of their high oxidative stability over a wide temperature range. The polyalkyl siloxanes, such as the dimethyl polysiloxane, are slightly preferred over the polyaryl, and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalene, chlorodiphenyl oxides and chlorinated paraffin waxes.

The fluorocarbon lubricants which are enhanced by this invention are linear polymers built up of a recurring unit which is

The fluorocarbon oils and greases are very stable chemically and have high thermal stability. These desirable physical properties appear to be closely related to the bond distances occurring in the fluorocarbon polymeric molecule, which may also contain chlorine bonded to carbon.

Polyalkylene glycol lubricants which are benefitted by the practice of this invention are ordinarily the reaction product of an aliphatic alcohol with an alkylene oxide. The preferred alkylene oxides are ethylene oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low pour points and they have the general formula $$R—(—O—C_nH_{2n})_xOH$$

where $n$ is small integer and depends upon the alkylene oxide employed and $x$ is a large integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula:

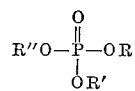

where R, R′ and R″ represent either hydrogen or an organic radical and where at least one of the groups represented by R, R′ and R″ is an organic radical. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include:

tris(2-chloro-1-methylethyl)phosphate;
tri-n-butyl-phosphate;
tris(2-ethylhexyl)phosphate;
triphenyl phosphate;
tris(p-chlorophenyl) phosphate;
diethyl m-tolyl phosphate;
p-chlorophenyl dimethyl phosphate;

tris(2-n-butoxyethyl) phosphate;
dimethyl m-tolyl phosphate;
di-n-propyl m-tolyl phosphate;
di-n-butyl phenyl phosphate;
1,3-butylene β-chloroisopropyl phosphate;
methyl di-m-tolyl phosphate;
bis(2-chloro-1-methylethyl) m-tolyl phosphate;
dimethyl 3,5-xylyl phosphate;
4-chloro-m-tolyl dimethyl phosphate;
2-ethyl-1-n-propyltrimethylene methyl phosphate;
4-chloro-m-tolyl 1-methyl trimethylene phosphate;
dimethyl n-octyl phosphate, and the like.

The synthetic base greases used in formulating lubricant compositions of the invention are formed by admixing a soap with an oil of any of the types described above. Such soaps are derived from animal or vegetable fats or fatty acids, wool grease; rosin, or petroleum acids. Typical examples are lead oleate, lithium stearate, aluminum tristearate, calcium glycerides, sodium oleate, and the like. In addition, the polyester greases may contain unreacted fat, fatty acids, and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with the polyester oils are preferred as they have superior oxidative stability as compared with greases formulated with other soaps, such as the sodium, calcium or lead soaps.

In preparing the improved lubricant compositions of this invention, an appropriate quantity of additive is blended with the oil to be stabilized. If desired, preformed concentrated solutions of the stabilizer in the base lubricant can be prepared and then subsequently diluted with additional lubricant to the desired concentration. An advantage of this invention is the fact that the additive compounds are easily and rapidly blended with the base oil and because of the relative low melting point of the stabilizer, there is no danger of separation of the stabilizer from the lubricant under normal use conditions. An additional advantage of this invention is that the benzyl amines are highly compatible with the usual additives that are frequently used to fortify lubricant compositions, such as detergent-dispersants, viscosity index improvers, dyes, anti-rush additives, anti-foaming agents, and the like.

EXAMPLE 21

With 100,000 parts of di-(sec-amyl) sebacate having a viscosity of 210° F. of 33.8 Saybold Universal seconds (SUS), a viscosity index of 133 and a molecular weight of 342.5 is blended 100 parts (0.1 percent) of 4,4'-methylenebis(2-isopropyl - 6 - butyl phenol). The resulting diester lubricant possesses greatly enhanced resistance against oxidative deterioration.

EXAMPLE 22

To 100,000 parts of di-(2-ethylhexyl) sebacate having a viscosity at 210° F. of 37.3 SUS, a viscosity index of 152 and a molecular weight of 462.7 is added 1000 parts (1 percent) of 4,4'-methylenebis(2,6-diisopropyl phenol). After mixing, the resultant diester lubricant possesses greatly enhanced oxidation resistance.

EXAMPLE 23

Five parts of 4,4'-methylenebis(2-isopropyl-6-tert-butyl phenol) are blended with 2495 parts of diisooctyl azelate having a kinematic viscosity of 3.34 centistokes at −65° F. (ASTM 445–52T), an ASTM slope from −40° F. to 210° F. of 0.693 (ASTM D541–43) and a pour point of −85° F. (ASTM D97–47). Its flash point is 425° F. (ASTM D92–52), and is specific gravity is 0.9123 at 25° C. The resulting lubricant is extremely stable to oxidation.

EXAMPLE 24

Three parts of 4,4'-methylenebis(2-isopropyl-6-tert-octyl phenol) are blended and mixed with 197 parts of a grease comprising 12.5 percent of lithium stearate, 1 part of polybutene (12,000 molecular weight), 2 percent of calcium xylyl stearate and 84.5 percent of di-(2-ethylhexyl) sebacate, to prepare an improved grease of this invention.

EXAMPLE 25

One part of 4,4'-methylenebis(2-isopropyl-6-sec-hexyl phenol) is blended with 75 parts of diisooctyl adipate having a viscosity of 35.4 SUS at 210° F., a viscosity of 57.3 SUS at 100° F., a viscosity of 3,980 SUS at −40° C. and a viscosity of 22,500 at −65° F. Its viscosity index is 143, its ASTM pour point is below −80° F. and its specific gravity (60° F.60° F.) is 0.926.

EXAMPLE 26

To a poly(trifluorochloroethylene) having the formula $(CF_2CHCl)_x$ and an average molecular weight of 880, pour point of 5° C. and a viscosity of 45 centistokes at 160° F. is added 1.25 percent of 4,4'-methylenebis(2-isopropyl-6-tert-amyl phenol) to prepare an improved lubricant of this invention.

EXAMPLE 27

To a phenylmethyl polysiloxane fluid having a viscosity of 100–150 centistokes at 25° C., an open cup flash point of 575° F. (ASTM–D–92–33), a freezing point of −60° F., and a specific gravity of 1.07 at 77° F. is added sufficient 4,4'-methylenebis(2-isopropyl-6-tert-butylphenol) to give a composition containing 0.1 percent of the compound.

EXAMPLE 28

To a polyalkylene glycol oil lubricant having a viscosity index of 148, ASTM pour point of −55° F., a flash point of 300° F., a specific gravity of 0.979 and a Saybolt viscosity of 135 at 100° F. is added 1 percent of 4,4'-methylenebis(2-isopropyl-6-tert-octylphenol) to prepare an extremely oxidation resistant polyalkylene glycol lubricant.

EXAMPLE 29

An improved lubricant of this invention comprising a chlorinated organic compound is prepared by admixing 0.5 percent of 4,4'-methylenebis[2-isopropyl-6-(1,1,3,3-tetramethylpropyl)phenol] with a chlorodiphenyl oil having a distillation range of from 554 to 617° F., a Saybolt viscosity at 100° F. of about 49, a pour point of −30° F. and a specific gravity of about 1.267.

In the lubricant compositions of this invention effective use can be made of other additives which are known to the art, such as other inhibitors, detergent dispersants, pour point depressants, viscosity index improvers, antifoam agents, rust inhibitors, oiliness or film strength agents, dyes and the like. Of the inhibitors which can be effectively used in combination with the compounds of this invention are sulfurized sperm oil, sulfurized terpenes, sulfurized paraffin wax olefins, aromatic sulfides, alkyl phenol sulfides, lecithin, neutralized dithiophosphates, phosphorus pentasulfide-terpene reaction products, diphenylamine, phenyl-naphthyl amine, β-naphthol, pyrogallol and the like. Typical of the detergent additives that can be used in the lubricant compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenyl sulfides (barium amyl phenol sulfide, calcium octyl phenol disulfide, etc.), metal salts of wax, substituted phenol derivatives and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the lubricant compositions of this invention will now be well known to those skilled in the art.

EXAMPLE 30

To illustrate the outstanding advantages achieved by the practice of the preferred embodiments of this invention, particularly when the compositions are subjected to elevated temperature, experiments were conducted using the Panel Coker Test. This test measures the oxidative stability of oils which are maintained at elevated temperatures in the presence of air, the oils periodically coming in contact with a hot metal surface. This test is described in the Aeronautical Standards of the Departments of Navy and Air Force, Spec. MIL-L-7808c, dated November 2, 1955. In these experiments, the diester lubricant was a commercially available di(2-ethylhexyl) sebacate which was devoid of additives. The Panel Coker apparatus was operated at 600° F. for ten hours on a cycling schedule—the splasher being in operation for five seconds followed by a quiescent period of 55 seconds. On completion of these tests the extent by which the various test oils were decomposed under these high-temperature oxidizing conditions was determined by weighing the amount of deposits which formed on the metallic panel. Under these test conditions, the use of the additive-free di(2-ethylhexyl) sebacate caused the formation of 138 milligrams of deposits on the metallic panel. However, the presence of only 0.5 percent by weight of 4,4'-methylenebis-(2-isopropyl-6-tert-butyl phenol) caused a reduction in panel deposit weight of over 91 percent, the panel only possessing 12 milligrams of deposit on completion of the stringent test. It is seen, therefore, that 4,4'-methylenebis-(2-isopropyl-6-tert-butyl phenol) provides outstanding resistance to oxidative deterioration when employed as an additive to diester oils.

The compounds of this invention are also useful as additives to functional fluids and automatic transmission fluids. The primary constituent of a functional fluid as a refined mineral lubricating oil having carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compound fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salts of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulphurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and socium bis (2-ethylhexyl) sulfosuccinate.

From about 0.03 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes or a $P_2S_5$-terpene reaction product; organic phosphates and phosphites such as for example, tricresylphosphate or a zinc dialkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as a polymerized olefin or isoolefin, butylene polymer or alkylated styrene polymer.

The following examples show typical functional fluids of this invention. The fluids are formed by mixing the ingredients together, while heating the oil to a temperature up to 200° F.

EXAMPLE 31

A fluid of this invention is prepared by blending 80 parts of a conventionally-refined Pennsylvania mineral oil (99 SUS at 100° F.), 2 parts of 4,4'-methylenebis(2,6-di-tert-butylphenol), 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

EXAMPLE 32

Another such fluid consists of 95 parts of a solvent-refined, light acid-treated, clay-contacted, solvent dewaxed paraffin base distillate mineral oil (110 SUS at 100° F.); 0.1 part of 4,4'-methylenebis(2,6-diisopropyl phenol); 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

EXAMPLE 33

An automatic transmission fluid is made by mixing 97 percent of an oil blend comprising 59.0 parts of a solvent-extracted, Coastal oil, 40 SUS at 210° F.; 1.0 part of 4,4'-methylenebis(2-isopropyl-6-tert-butylphenol); 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

EXAMPLE 34

96 parts of a conventionally-refined Pennsylvania mineral oil (99 SUS at 100° F.); 2 parts of 4,4'-methylenebis (2,6-di-tert-butylphenol); 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity 60/60° F. of 0.988 are blended into an effective fluid of this invention.

As noted above, the compounds of this invention are also excellent antioxidants for saturated hydrocarbon polymers.

Polyethylene and polypropylene are, for example, hydrocarbon polymers derived from the polymerization of ethylene and propylene. This polymerization can be accomplished by a great variety of methods which lead to products of diverse properties. Polymers of any nature may advantageously be utilized for preparing compositions according to the present invention. The polymers which are employed may, for example, be similar to those which may be obtained by polymerizing ethylene in a basic aqueous medium and in the presence of polymerization favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Groups IVB, VB and VIB metals of the Periodic System; chromium oxide on silicated alumina; hexavalent molybdenum compounds; and charcoal supported nickel-cobalt. The polymer which results from these various polymerization processes may have a molecular weight in the range from 1300 to over 1,000,000 depending on the particular conditions of polymerization employed.

EXAMPLE 35

The benefits derived from the practice of this invention are demonstrated by comparative oxidation tests of uninhibited polyethylene and polyethylene containing an antioxidant of this invention. These tests are conducted as follows: the selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted nito a chamber which may be sealed and which is connected to a capillary tube leading to a gas buret and leveling bulb. The apparatus is flushed with oxygen at room temperature, sealed, and the temperature is raised to 150° F. The oxygen pressure is maintained at 1 atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In a test of this nature 0.05 percent of a preferred antioxidant of this invention, 4,4'-methylenebis(2-isopropyl-6-tert-butylphenol) is added to one sample of the polyethylene. Another sample of the polyethylene is tested uninhibited. The uninhibited sample has no induction period and takes up oxygen immediately while the sample containing 4,4'-methylenebis-(2-isopropyl - 6 - tert-butylphenol) has an extremely long induction period.

There are several methods available for preparing the inhibited hydrocarbon polymer compositions of this invention. Thus the blending of the additives of this invention, with a polymer such as, for example, polyethylene, may be carried out on open rolls, on internal mixers or may be accomplished by mixing with extrusion. It is also possible to prepare concentrated batches of the polymer containing excessive amounts of the additive and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The additive may be initially mixed with the polymer in the dried state or may be first dissolved in a suitable solvent, then sprayed on the polymer and milled in.

Examples of the hydrocarbon polymer compositions of this invention prepared as described above follow. All parts and percentages are by weight in these examples.

EXAMPLE 36

To 1,000 parts of polyethylene produced by oxygen catalized reaction under a pressure of 20,000 atmospheres and having an average molecular weight of 40,000, is added and mixed 2 parts of 4,4'-methylenebis(2,6-di-isopropylphenol). The resulting composition has a greatly increased oxidative stability.

EXAMPLE 37

To 100 parts of polyisobutylene having an average molecular weight of 100,000 is added 0.5 part of 4,4'-methylenebis(2,6-di - tert - butylphenol). The oxidative stability of the polymer is greatly increased by the addition of this compound.

EXAMPLE 38

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-methylenebis(2-isopropyl-6-tert-butylphenol). Polyethylene of improved oxidative stability results.

EXAMPLE 39

A linear polyethylene having a high degree of crystallinity (up to 93 percent) and below 1 ethyl branched chain per 100 carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-methylenebis(2,6 - di - tert - butylphenol), and the resulting product has improved stability characteristics.

EXAMPLE 40

To a polyethylene having an average molecular weight of 1500, a melting point of 88–90° C. and a specific gravity of 0.92 is added 1 percent of 4,4'-methylenebis[2-isopropyl-6-(1,1,3,3 - tetramethylbutyl)phenol]. After milling in the antioxidant an extremely oxidation resistant product results.

EXAMPLE 41

Two parts of 4,4'-methylenebis(2-tert-butyl - 6 - tert-amylphenol) are added with milling to 100 parts of a low density polyethylene prepared by high pressure polymerization and which has an average molecular weight of about 20,000. The resulting product is vastly improved in its oxidative stability.

EXAMPLE 42

To 10,000 parts of a polyethylene having an average molecular weight of about 100,000 and which has a tensile strength of 5400 p.s.i., a Short D hardness of 70 and a softening temperature of 130° C. under low load is added 10 parts of 4,4'-methylenebis(2,6 - di - tert-butylphenol) to prepare a composition of outstanding oxidative stability.

EXAMPLE 43

To a polyisobutylene polymer having an average molecular weight of 35,000 is added sufficient 4,4'-methylenebis[2 - isopropyl - 6 - (1,1,2,2 - tetramethylpropyl) phenol] to give a composition containing 0.03 percent of the antioxidant. The composition has improved antioxidant properties due to the presence of 4,4'-methylenebis[2 - tert - butyl - 6 - (1,1,2,2 - tetramethylpropyl) phenol].

EXAMPLE 44

To 1,000 parts of a solid polypropylene polymer having a density of 0.905 and a Rockwell hardness greater than 85, in which isotactic is added and blended to 5 parts of 4,4'-methylenebis(2,6-di-tert-butylphenol).

EXAMPLE 45

To an isotactic polypropylene having a tensile strength greater than 4300 p.s.i. and a compressive strength of about 9,000 p.s.i., is added sufficient 4,4'-methylenebis(2-isopropyl-6-tert-butylphenol).

EXAMPLE 46

To a wax-like polypropylene having a melting point above 130° C. and a molecular weight of about 4,000, a density of 0.913 is added 0.2 percent of 4,4'-methylenebis-(2,6-diisopropylphenol). The antioxidant is added to the polypropylene in the molten state and the mixture is allowed to solidify into the desired shape. A polypropylene product of outstanding oxidative stability results.

In addition to the additive of this invention saturated hydrocarbon polymers may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Other hydrocarbon polymers which are stabilized against oxidative deterioration according to this invention include natural rubber, GR-S and GR-N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general elastomeric hydrocarbon polymers which are normally susceptible to oxidative deterioration. Such polymers are well known in the art and besides being suscepible of oxidative deterioration are characterized by having molecular weights above about 10,000. The problem resulting from heat, light and catalyst promoted oxidative deterioration in such hydrocarbon polymers is intensified because of free radical formation within the polymers. This leads to various forms of physical and chemical degradation such as chain scission, autocatalytic oxidation, reduction in molecular weight and loss of original physical properties. The net result is that the desirable, useful and necessary properties of the polymers which are associated with their original chemical structure and molecular weights are lost to a greater or lesser extent unless the polymers are stabilized against such deterioration.

Typical stabilized hydrocarbon polymers of this invention are illustrated by the following specific examples wherein all parts and percentages are by weight.

EXAMPLE 47

To a synthetic rubber master batch comprising 100 parts of GR–S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 4,4'-methylenebis[2-isopropyl-6-(1,1,3,3-tetramethylbuyl)phenol]. This batch is then cured for 60 minutes at 45 pounds per square inch of steam pressure.

EXAMPLE 48

To a master batch described in Example 47 is added 0.5 percent of 4,4'-methylenebis(2,6-di-tert-butylphenol).

EXAMPLE 49

One percent of 4,4'-methylenebis(2-isopropyl-6-tert-butylphenol) is added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 47.

EXAMPLE 50

Two parts of 4,4'-methylenebis[2,6-di-(1,1,3,3-tetramethylbutyl)phenol] is incorporated in 100 parts of raw butyl rubber prepared by the copolymerization of 90 percent of isobutylene and 10 percent of isoprene and having an average molecular weight of 100,000.

EXAMPLE 51

To 200 parts of raw butyl rubber having an average molecular weight of 600,000 and prepared by copolymerizing 95 percent of isobutylene and 5 percent of butadiene is added 1.5 parts of 4,4'-methylenebis[2-isopropyl-5-(2-octyl)phenol].

EXAMPLE 52

To a master batch of GR–N synthetic rubber comprising 100 parts of GR–N rubber having an average molecular weight of 75,000, 5 parts of zinc stearate, 50 parts of carbon black, 5 parts of road tar, 2 parts of sulfur and 2 parts of mercaptobenzothiazole is added 5 percent based on the weight of the batch of 4,4'-methylenebis(2,6-di-tert-butylphenol).

EXAMPLE 53

A dry blend of polystyrene and 4,4'-methylenebis(2-isopropyl-6-tert-amylphenol) is prepared by mixing 1 part of this phenol with 100 parts of polystyrene having an average molecular weight of 50,000.

EXAMPLE 54

0.25 percent by weight of 4,4'-methylenebis(2,6-di-tert-butylphenol) is incorporated in polybutadiene having an average molecular weight of 50,000.

EXAMPLE 55

To natural rubber (Hevea) is added 0.02 percent of 4,4'-methylenebis(2,6-diisopropylphenol).

The above examples illustrate the improved compositions of this invention. Other such compositions and the methods of preparing the same will now be apparent to one skilled in the art.

The amount of inhibitors of this invention employed in hydrocarbon polymers varies from about 0.01 to about 5 percent by weight of the polymer stabilized depending upon the nature of the polymer and the conditions of service to be encountered. Thus, in the stabilization of natural and synthetic rubber to be used in the manufacture of tires which are normally subjected to exposure to the elements as well as to the action of sunlight, frictional heat, stress and the like, the use of relatively high concentrations of our inhibitors is advantageous. On the other hand, when the article of manufacture is not to be subjected to such severe conditions, such as in the case of molded goods fabricated from polyethylene, relatively low concentrations of our inhibitor can be successfully utilized.

As noted above the stabilizers of this invention are also excellent additives to tetraalkyllead antiknock compositions. The tetraalkyllead antiknock agents which are stabilized according to this invention are represented by such compounds as tetramethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the antiknock compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, β,β'-dibromodiisopropyl ether, β,β'-dichlorodiethyl ether, trichlorobenzene, dibromotoluenes, and in general those disclosed in U.S. Patents 1,592,954; 1,668,022; 2,364,921; 2,479,900; 2,479,901; 2,479,902; 2,479,903 and 2,496,983. In short, we prefer to employ scavengers containing only elements selected from the group consisting of carbon, hydrogen, bromine, chlorine and oxygen. The amount of scavenger used is from about 0.5 to about 2.0 theories, a theory being defined as the quantity required to react with the lead to form lead halide—i.e. 2 atoms of halogen per atom of lead. When we use mixtures of bromine-containing and chlorine-containing scavengers, particularly bromo and chlorohydrocarbons, we can employ concentrations and proportions as described in U.S. Patent 2,398,281. Such concentrations are sufficient to control the amount of deposits formed in the engine.

Representative tetraalkyllead antiknock compositions of this invention are presented in Table II following. The figures following the representative ingredients are parts by weight. The two figures following the stabilizing ingredient show respectively the amounts which are used to obtain a composition containing 0.1 and 1.0 percent by weight of stabilizer based on the lead alkyl antiknock agent. It will be apparent that if the lower figure is halved, the resulting composition will contain 0.005 percent by weight of the stabilizing ingredient based on the lead alkyl, whereas doubling the second figure will provide a composition containing 2.0 percent. Should other concentrations be desired, the proper adjustments are evident.

*Table II*

ANTIKNOCK FLUID COMPOSITIONS

| Antiknock Agent | Scavenger | Stabilizer |
|---|---|---|
| Tetramethyllead 267 | None | 4,4'-Methylenebis[2,6-di-(1,1,3,3-tetramethylbutyl)phenol] 0.27–2.67. |
| Do | Ethylene dibromide 266 | 4,4'-Methylenebis(2,6-diisopropylphenol), 0.27–2.67. |
| Do | Ethylene dibromide 94 and ethylene dichloride 99. | 4,4'-Methylenebis(2-isopropyl-6-tert-butylphenol), 0.27–2.67. |
| Tetraethyllead 323 | None | 4,4'-Methylenebis[2-isopropyl-6-(1,1,3,3-tetramethylbutyl)phenol], 0.32–3.23. |
| Do | Ethylene dibromide 188 | 4,4'-Methylenebis(2,6-di-tert-butylphenol), 0.32–3.23. |
| Do | Ethylene dibromide 94 and ethylene dichloride 99. | 4,4'-Methylenebis(2,6-di-tert-amylphenol), 0.32–3.23. |
| Do | Mixed dibromotoluenes 200 | 4,4'-Methylenebis (2,6-di-tert-butylphenol) 0.32–3.23. |
| Do | Mixed dibromotoluenes 125 and ethylene dichloride 99. | 4,4'-Methylenebis[2,6-di-(1,1,3,3-tetramethylbutyl)phenol] 0.32–3.23. |
| Do | Mixed dibromotoluenes 150 and 1,2,4-trichlorobenzenes 175. | 4,4'-Methylenebis(2,6-diisopropylphenol), 0.32–3.23. |
| Do | Ethylene dibromide 94 and mixed trichlorobenzenes 146. | 4,4'-Methylenebis(2,6-di-tert-butylphenol), 0.32–3.23. |
| Do | 1,4-Dibromobutane 126 | 4,4'-Methylenebis[2-isopropyl-6-(1,1,3,3-tetramethylbutyl)phenol] 0.32–3.23. |
| Do | 1,4-Dibromobutane 108 and 1,4-dichlorobutane 127. | 4,4'-Methylenebis (2-isoproypl-6-tert-amylphenol), 0.32–3.23. |
| Tetrapropyllead 379 | Acetylene tetrabromide 346 | 4,4'-Methylenebis[2,6-di-(2-octyl)phenol], 0.38–3.79. |
| Dimethyldiethyllead 295 | β,β'-Dibromodiethyl ether 232. | 4,4'-Methylenebis[2-tert-butyl-6-(1,1,2,2-tetramethylpropyl)phenol], 0.30–2.95. |
| Methyltriethyllead 309 | β,β'-Dibromodiiso-propyl ether 130 and β,β'-dichlorodiethyl ether 143. | 4,4'-Methylenebis(2,6-di-tert-butylphenol) 0.31–3.09. |

The antiknock fluid compositions shown in the above table are presented for illustrative purposes only. Other such compositions will be apparent to one skilled in the art. In all instances, the presence of the compound of this invention enhances the stability characteristics of the formulation over those prevailing in the absence of our stabilizer.

To demonstrate the unexpected potency of the compounds of this invention as tetraalkyllead stabilizers, recourse is had to accelerated fluid storage tests. Portions of an antiknock fluid consisting essentially of tetraethyllead, 0.5 theory of bromine as ethylene dibromide and 1.0 theory of chlorine as ethylene dichloride were placed in glass bottles containing 80 percent outage; that is, the bottles contained 80 percent by volume of air.

In one instance, 4,4'-methylenebis(2-isopropyl - 6 - tert-butylphenol) is blended with the above antiknock fluid so that the concentration of this stabilizer was 0.06 percent by weight based upon the weight of the tetraethyllead present. The sample is stored at 50° C. for a period of 168 hours. The amount of antiknock fluid decomposition which occurs during this stringent storage test is found by determining the ammonia-soluble lead contents of the samples by chemical analysis. Basically the method involves extracting from the samples all lead salts formed during storage by means of an ammonia-ammonium acetate solution and assaying the amount of such salts in the extract by conventional means. Thus, the method provides a reliable measure of the amount of decomposition which has occurred during the storage test described above. The results of this test show that the compound is an excellent stabilizer for tetraethyllead containing antiknock fluids.

Another method of demonstrating the benefits of this invention is to conduct storage test procedures. For example, antiknock fluid compositions of this invention and comparable formulations not containing our stabilizer are placed in glass or cold rolled steel containers which are then stored at a constant temperature of 122° F. under air. Periodic inspection and analysis of the samples shows that the unprotected antiknock fluid compositions continually deteriorate with the formation of insoluble sludges and other decomposition products, whereas those formulations of this invention remain practically unchanged.

The tetraalkyllead antiknock compositions of this invention may contain other ingredients such as dyes for identification purposes, metal deactivators, diluents and the like.

Antiknock compositions containing tetraalkyllead antiknock agents are employed by adding them to gasoline to improve the antiknock quality thereof. Such gasolines both before and after addition of the antiknock fluid are benefited by the practice of this invention. Thus, gasolines to which have been added a compound of this invention are found to be more stable upon prolonged periods of storage.

The following examples illustrate gasoline embodiments of this invention.

EXAMPLE 56

To 10,000 parts of a grade 115/145 aviation gasoline containing 4.5 ml. of tetraethyllead per gallon which has an initial boiling point of 110° F. and a final boiling point of 330° F. and an API gravity of 71.0° is added .5 percent of 4,4'-methylenebis(2-isopropyl-6-tert-butylphenol).

EXAMPLE 57

To a gasoline containing 26.6 percent aromatics, 20.8 percent olefins and 52.6 percent saturates and which has an API gravity of 62.1° is added 0.1 percent of 4,4'-methylenebis(2,6-diisopropylphenol).

Similarly, other compounds of this invention may be added with benefit to gasoline of whatever nature and however processes.

As noted above the compounds of this invention are also extremely useful in inhibiting and stabilizing non-petroleum fats and oils normally subject to the deteriorating effect of oxidative rancidity. In particular, compounds of this invention are excellent stabilizers for animal fats and oils, especially lard, against the effects of rancidity. The compounds of this invention may be used in concentrations from 0.001 to about 0.1 weight percent in this embodiment of the invention. In addition, an acid synergist may be employed to promote the activity of the additives of this invention. These synergists which mutually cooperate with the compounds of this invention to produce a disproportionately large increase in effectiveness in stabilizing fatty materials including citric acid, phosphoric acid, ascorbic acid, ethyl acid phosphate, glucuronolactone, phytic acid, tartaric acid and aconitric acid.

In formulating the stabilized non-petroleum fats and oils of this invention, the additive or combination of additives is incorporated by appropriate means into the substrate to be stabilized. Thus, in the case of animal, vegetable and fish oils, the additive or combination of additives is added in appropriate quantity and the resulting mixture agitated to insure homogeneity. Where the substrate is a solid at room temperature—e.g., fats, butter, etc.—the mixing is preferably carried out at temperatures above the melting point of the substrate. When a combination of additives is used, they can be mixed with the substrate as a preformed mixture or can be separately blended therewith in either order. Generally speaking, it is desirable to first dissolve the additive or additive combination in high concentration in a small portion of the material to be stabilized. The resulting concentrated solution then blended with the remaining bulk. Another way of facilitating the formulation of the composition of this invention is to pre-dissolve the additive or combination of additives in a suitable solvent, such as ethanol, glycerol, propylene glycol, etc. and then mix the resultant solution with the material to be stabilized. However, the preferred way of formulating the compositions of this invention is to pre-dissolve the additive or additive mixture in a fatty acid partial ester of a polyhydroxy compound, notably a monoglyceride, and then blend this mixture with the material to be stabilized. The nature of these monoglyceride compositions is well known in the art and may be made from either animal or vegetable fats, with or without previous hydrogenation. These compositions generally contain about 40 percent of the monostearyl, monooleayl, and/or monopalmityl glycerides or mixtures thereof with the balance comprising a mixture of di- and tri-glycerides. Molecularly distilled monoglycerides may also be used for this purpose. These compositions will be apparent from the following examples.

EXAMPLE 58

With 1,000 parts of melted lard is mixed one part (0.1 percent) of 4,4'-methylenebis(2,6-di-tert-butylphenol). After cooling the lard can be stored for long periods of time without the development of rancidity.

EXAMPLE 59

With 5,000 parts of cottonseed shortening is blended 0.05 part (0.001 percent) of 4,4'-methylenebis(2-isopropyl-6-tert-butylphenol). The resulting shortening has improved resistance against oxidative rancidity.

EXAMPLE 60

In 2.5 parts of propylene glycol is dissolved with stirring one part of 4,4'-methylenebis(2-isopropyl-6-tert-butylphenol). The resulting mixture is then added with stirring to 10,000 parts of cod liver oil. The resultant oil containing 0.01 percent of 4,4'-methylenebis(2-isopropyl-6-tert-butylphenol) possesses increased resistance against oxidative deterioration.

EXAMPLE 61

To 10,000 parts of corn oil are added with stirring 5 parts (0.05 percent) of 4,4'-methylenebis(2,6-di-tert-amylphenol) and 2 parts (0.02 percent) of ascorbic acid. The resulting corn oil has improved storage stability characteristics.

EXAMPLE 62

To 100 parts of monoglyceride (prepared from a partially hydrogenated vegetable oil) heated to 180° F. is added with stirring 5 parts of 4,4'-methylenebis(2-isopropyl-6-tert-butylphenol) and 4 parts of citric acid. Ten parts of the resultant monoglyceride formulation are added with stirring to 10,000 parts of melted prime steam lard. The lard composition so formed which contains 0.005 percent of 4,4'-methylenebis(2-isopropyl-6-tert-butylphenol) and 0.004 percent of citric acid can be stored at room temperature for long periods of time without developing rancidity.

Those skilled in the art will now clearly understand the various methods of preparing the improved compositions of this invention.

In addition to the compounds of the present invention, the compounds disclosed in application Serial No. 536,315, filed September 23, 1955, are also highly useful additives, as illustrated by the following examples.

EXAMPLE 63

Engine tests were used to demonstrate the properties of 4,4'-methylenebis(2,6-di-tert-butylphenol) in causing very substantial reductions in engine wear when used in motor oils. One such series of tests was the Chevrolet L-4 test (as described in "CRC Handbook," Coordinating Research Council, New York, J. J. Little and Ives Co., 1946) in which the individual piston rings were weighed before and after the tests in order to determine ring wear. A series of concentrations of 4,4'-methylenebis(2,6-di-tert-butylphenol) in the range of 0.40 to 1.50 percent by weight were tested. The base oil in these tests was a non-additive SAE 20 blend of solvent-refined neutral and bright stock having a viscosity index of 109 and a viscosity of 372 Saybolt Universal seconds (SUS) at 100° F. A bulk-oil temperature of 280° F. was maintained throughout each 36 hour test period and in addition to the weight measurement of the piston rings, two copper-lead bearings were weighed before and after each test in order to measure bearing corrosion. The effectiveness of the additive as an antioxidant was also determined by making standard inspections of the properties of the used oils.

The tremendous effectiveness of 4,4'-methylenebis(2,6-di-tert-butylphenol) in inhibiting engine wear is shown by the results of these tests in which ring wear was reduced in a linear relationship with additive concentration.

It was also found that rings from the base oil were severely scuffed while the rings from the tests using the higher concentrations of 4,4'-methylenebis(2,6-di-tert-butylphenol) showed almost no wear as evidenced by the clearly visible original tool marks on the top piston ring faces which were essentially unaltered during the test.

In the above L-4 tests substantial reductions in oil oxidation and bearing corrosion occurred, and especially when 4,4'-methylenebis(2,6-di-tert-butylphenol) was used at concentrations of 0.75 and 1.5 percent by weight.

EXAMPLE 64

Further proof of the outstanding wear inhibiting potency of 4,4'-methylenebis(2,6-di-tert-butylphenol) was provided by Chevrolet "Full Throttle" tests.

In order to increase the severity of the L-4 conditions, tests were performed in the Chevrolet engine using the L-4 operating conditions of speed, and sump and jacket temperatures, but substituting full-throttle operation for the L-4 part-throttle condition. This change doubled the fuel consumption of the engine and increased the brake horsepower from 30 to 70, thereby raising the temperatures in the ring zone.

The base oil in these tests was the same as used in the L-4 tests in Example I; it was compared with a blend containing 1.5 percent of 4,4'-methylenebis(2,6-di-tert-butylphenol). The results are shown in Table III.

*Table III*

EFFECT OF 4,4'-METHYLENEBIS(2,6-DI-TERT-BUTYLPHENOL) IN "FULL THROTTLE" CHEVROLET TEST

|  | Base Oil | Oil+1.5 percent 4,4'-methylenebis (2,6-di-tert-butylphenol) |
|---|---|---|
| Piston Ring Wt. Loss in Grams Avg. of 6 rings: | | |
| Top ring | .48 | .15 |
| Second ring | .26 | .07 |
| Oil ring | .21 | .05 |
| Piston Ring Gap Increase in inches, Avg. of 6 rings: | | |
| Top ring | .017 | .008 |
| Second ring | .012 | .004 |
| Oil ring | .038 | .013 |
| Copper Lead Bearing Corrosion: Avg. grams per bearing | .584 | .199 |
| Engine Cleanliness: | | |
| Piston skirt varnish | 8.4 | 8.9 |
| Total varnish rating | 45.2 | 46.9 |
| Total engine rating | 91.2 | 93.3 |
| 36-Hour Used Oil Properties: | | |
| Acid number | 3.3 | 1.0 |
| Percent increase in viscosity at 100° F | 29. | 13. |

When the base oil was used, the rings were severely scuffed and the wear rate was several times greater than in the L-4 test. 4,4'-methylenebis(2,6-di-tert-butylphenol) again demonstrated very effective wear inhibition as measured by ring-weight loss and ring-gap increase. Also, satisfactory oxidation and bearing-corrosion inhibition and a measurable improvement in piston-skirt varnish rating were observed for the oil containing 4,4'-methylenebis-(2,6-di-tert-butylphenol).

EXAMPLE 65

Other engine tests still further demonstrated the characteristic of 4,4'-methylenebis(2,6-di-tert-butylphenol) in markedly reducing engine wear. In these tests use was made of the Chevrolet FL-2 procedure, a low jacket-temperature, high load test which has been used to evaluate fuel cleanliness. In this 40 hour test, engine speed is 2500 revolutions per minute, brake horsepower output is 45, and the water-jacket inlet temperature is 90° F. Corrosive-type ring and bore wear is usually associated with such a low jacket temperature. Tests were conducted using the same fuel and base oil as in the Chevrolet L-4 test. Two concentrations of 4,4'-methylenebis(2,6-di-tert-butylphenol) were employed, viz., 0.75 and 1.5 percent by weight.

Both additive concentrations of 4,4'-methylenebis(2,6-di-tert-butylphenol) showed a large reduction in ring wear when compared with the base oil. For example, the top piston ring weight loss in terms of grams per six rings was reduced from 0.65 to 0.42 by the lower concentration and to 0.41 by the higher concentration.

EXAMPLE 66

In order to further evaluate the anti-wear properties of 4,4'-methylenebis 2,6-di-tert-butylphenol) under other conditions of engine design and operation and with the use of a different wear measurement technique, a series of tests were undertaken in a single-cylinder engine fitted with a radioactive top piston ring. The engine was an overhead-valve prototype of the 1951 Oldsmobile engine. The radioactivity detection system was of the flow-monitored type.

The tests were conducted on an operating schedule that is conducive to ring scuffing:

2500 r.p.m.
95 lbs./hr. air flow (supercharger source)
0.080 F/A ratio (constant injection system)
180° F. jacket water temperature
100° F. air intake temperature
200° F. oil sump temperature Ignition cycle:
 2.5 minutes at 30° B.T.C. (max. power)
 10 seconds at 100° B.T.C. (60 percent power)
Test time—20 hours
Test per evaluation—three tests per evaluation, preceded and followed by baseline tests The fuel was technical grade isooctane containing 3 milliliters of tetraethyllead per gallon as 62 Mix and 0.05 percent by weight of sulfur as disulfide oil.

Because of the development of very high engine temperatures and the need to disperse wear debris for circulation through the detection system, a detergent was used with the antioxidant in these tests. This provided an opportunity to evaluate 4,4'-methylenebis(2,6-di-tert-butylphenol) in combination with detergents. For comparative purposes, a similar oil blend containing a well-known antioxidant—zinc dithiophosphate—in combination with a detergent was subjected to the same test.

The oil in these tests was a blend of a solvent-refined neutral oil (95 VI and 200 SUS at 100° F.) with 6 percent of a commercial methacrylate-type VI improver. This formulation, which is typical of blends used in multiple-viscosity-grade oils, had a VI of 140 and a viscosity of 300 SUS at 100° F.

In the first series of tests, the base oil contained 4 percent of a commercial barium phenol sulfide detergent-antioxidant. A comparison was made with two concentrations of 4,4'-methylenebis(2,6-di-tert-butylphenol) in the base oil-phenate blend. 4,4'-methylenebis(2,6-di-tert-butylphenol) concentrations of 0.75 percent and 1.50 percent caused an equal and significant reduction in the rate of ring wear, the top piston ring wear rate being reduced by about 30 percent.

In the second series of tests, a typical commercial oil formulation containing a balanced blend of 4 percent barium sulfonate and 1 percent zinc dithiophosphate was compared with the same base oil containing 4 percent barium sulfonate and 1.5 percent of 4,4'-methylenebis-(2,6-di-tert-butylphenol). In effect, 4,4'-methylenebis-(2,6-di-tert-butylphenol) was substituted for the zinc dithiophosphate. A significantly lower rate of ring wear was observed with the oil containing 4,4'-methylenebis-(2,6-di-tert-butylphenol) than with the oil containing zinc dithiophosphate.

These results provide another example of engine conditions and wear measurement technique in which 4,4'-methylenebis(2,6-di-tert-butylphenol) effectively minimized abrasive ring wear. They also show that this antiwear effect was obtained in the presence of the two most widely used types of commercial motor oil detergents.

The compounds are also effective antioxidants for use in steam turbine oils. This is demonstrated by making use of the standard test procedure of the American Society for Testing Materials bearing ASTM designation D–943–54. According to this test procedure, 300 milliliters of a suitable test oil is placed in contact with 60 milliliters of water and the resulting oil-water system is maintained at a temperature of 95° C. while passing oxygen therethrough at a rate of three liters per hour. Oxidation is catalyzed by the use of iron and copper wire. Periodically measurements are made of the acid number of the test oil and failure of an antioxidant is indicated by an acid number in excess of 2.0. It is found that when the various compounds of this invention are added in small antioxidant quantities to steam turbine oils, substantial resistance against oxidative deterioration results.

EXAMPLE 67

The effectiveness of 4,4'-methylenebis(2,6-di-tert-butylphenol) as an inhibitor of oxidative deterioration of steam turbine oils was demonstrated by conducting a series of comparative tests according to the above ASTM test procedure. In these tests a 95 V.I. solvent-refined SAE-10 hydrocarbon oil was used as the test oil. Steam turbine oil compositions of this invention were formulated by blending 0.7 and 1.0 percent by weight of 4,4'-methylenebis(2,6-di-tert-butylphenol) with this test oil. For comparative purposes, identical concentrations of 2,6-di-tert-butyl-4-methylphenol were blended with the same test oil. The results of these tests are shown in Table IV.

Table IV

EFFECT OF ANTIOXIDANTS ON THE OXIDATIVE DETERIORATION OF STEAM TURBINE OIL

| Additive | Conc. Percent by Wt. | Acid Number, Hours | | | | |
|---|---|---|---|---|---|---|
| | | 500 | 600 | 700 | 800 | 900 |
| 4,4'-Methylenebis(2,6-di-tert-butylphenol) | 0.7 | 0.5 | 0.5 | 0.6 | 0.6 | 18.9 |
| 2,6-Di-tert-butyl-4-methylphenol | 0.7 | 0.3 | 0.5 | 0.5 | 11.2 | 23.0 |
| 4,4'-Methylenebis(2,6-di-tert-butylphenol) | 1.0 | 0.6 | 0.5 | 0.6 | 0.4 | 1.0 |
| 2,6-Di-tert-butyl-4-methylphenol | 1.0 | 0.4 | 0.5 | 0.6 | 8.8 | 17.8 |

Referring to the data of Table IV, it is clearly apparent that 4,4'-methylenebis(2,6-di-tert-butylphenol) is much more effective in inhibiting oxidative deterioration of steam turbine oil than is 2,6-di-tert-butyl-4-methylphenol.

EXAMPLE 68

The compounds are also very effective antioxidants for grease. The potency of the compounds in this respect is demonstrated by conducting the Norma Hoffman Grease Oxidation Stability Test, ASTM Test Procedure D–942–50. It is found that the presence of minor proportions of the compounds of this invention in conventional greases greatly inhibits oxidative deterioration. By way of example an initially antioxidant-free lithium base grease was modified to the extent that it contained 0.5 percent by weight of 4,4'-methylenebis(2,6-di-tert-butylphenol) and was subjected to the above oxidation stability test. It was found that the presence of 4,4'-methylenebis(2,6-di-tert-butylphenol) greatly retarded oxygen absorption by the grease. Thus, after maintaining this grease composition in the oxygen bomb for 376 hours under the standard test conditions, the oxygen bomb pressure had been reduced from 110 p.s.i. to 98 p.s.i. This represents a very small diminution of oxygen pressure in the light of the severe test conditions employed and is indicative of an extremely small amount of oxygen absorption.

We claim:
4,4' - methylene - bis(2,6 - diisopropylphenol) having the formula:

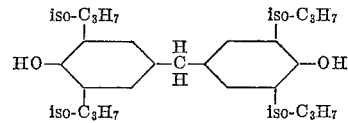

References Cited in the file of this patent

UNITED STATES PATENTS

| 2,807,653 | Filbey | Sept. 24, 1957 |
| 2,841,623 | Norton et al. | July 1, 1958 |
| 2,944,086 | Coffield et al. | July 5, 1960 |

OTHER REFERENCES

Coffield et al.: Abstracts of Papers, 128th Meeting of American Chemical Society (Sept. 11–16, 1955), pages 74-O and 75-O (2 pages).